No. 876,915. PATENTED JAN. 14, 1908.
H. & M. RUFTY.
VEGETABLE CUTTER AND TRIMMER.
APPLICATION FILED SEPT. 14, 1907.
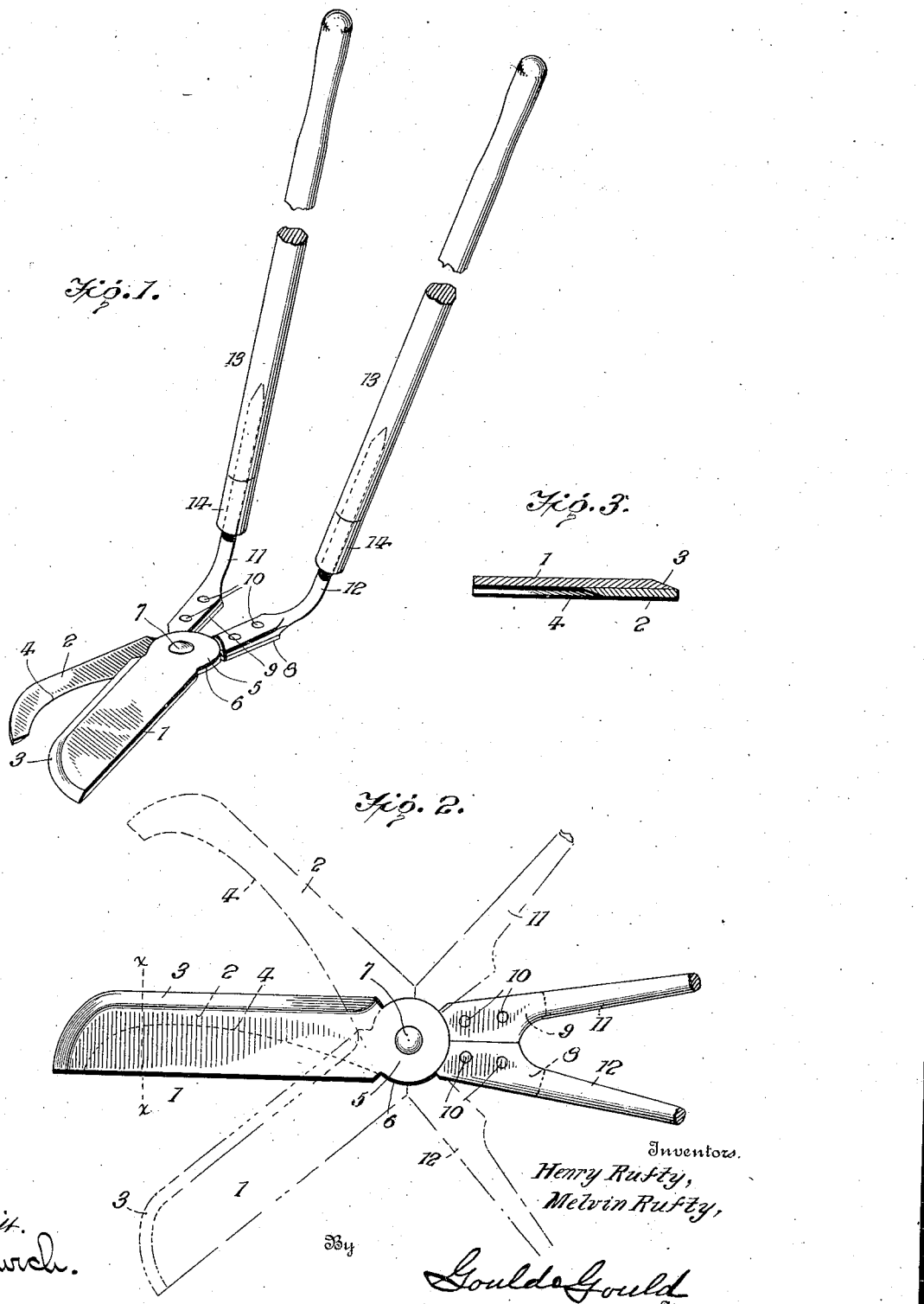

UNITED STATES PATENT OFFICE.

HENRY RUFTY AND MELVIN RUFTY, OF FREMONT, OHIO.

VEGETABLE CUTTER AND TRIMMER.

No. 876,915.        Specification of Letters Patent.        Patented Jan. 14, 1908.

Application filed September 14, 1907. Serial No. 392,906.

*To all whom it may concern:*

Be it known that we, HENRY RUFTY and MELVIN RUFTY, citizens of the United States, residing at Fremont, in the county of Sandusky and State of Ohio, have invented certain new and useful Improvements in Vegetable Cutters and Trimmers, of which the following is a specification.

The invention relates in general to a vegetable cutter and trimmer and particularly to a device for severing the tops of growing beets from the body thereof, cutting away all superfluous parts from a standing head of cabbage and cutting the dressed head of cabbage from the growing stalk.

The main object of the invention is the production of a device of the character described which, while formed of few parts simply constructed, shall be highly efficient in accomplishing the results desired and adapted to facilitate the rapid trimming and cutting of the vegetables for which it is specifically designed.

Another object is to provide a tool which in use tends to eliminate the danger incident to the employment of the ordinary tools commonly used for dressing and cutting these vegetables and to enable the operator to perform his work while in a practically standing position.

With these objects in view, the invention will now be described in the following specification, reference being had to the accompanying drawings forming a part thereof, and then pointed out in the claims.

In the drawings, Figure 1 is a broken perspective of my improved cutter and trimmer. Fig. 2 is a broken, enlarged top plan of the device, showing the cutting blades in both closed and open position. Fig. 3 is a transverse section of the closed blades, taken on line *x—x* of Fig. 2 looking toward the points of the blades.

Referring now to the drawings, wherein like reference numerals refer to like parts throughout the several views, the invention comprises cutting blades 1 and 2, the co-acting beveled edges 3 and 4 of which, near their outer ends, are curved in the same direction for a purpose hereinafter described, blade 2 underlying blade 1 when the blades are in closed position, as shown in Fig. 2, blade 1 being beveled from the under side and blade 2 from the upper side. The blades are formed with integral, similar bearing plates 5 and 6, bored to receive a pivot-bolt 7, designed to hold the blades in desired movable relation and permitting opening and closing thereof. The rear ends of said bearing plates are formed into attaching strips 8 and 9, of such form and dimensions that they abut each other when the blades are in closed position and form stops to limit movement of the blades. These attaching strips are designed to be connected, through the medium of removable rivets 10 to a pair of upwardly-turned handle supports 11 and 12, the function of which is to receive and hold in appropriate-angled position removable operating handles 13, provided with protecting ferrules 14 and formed of any suitable material, length, and outline. The handle supports are so bent as to position the operating handles, when attached thereto, in such relative relation to the cutting blades as to permit said handles to be readily grasped and operated by one in a conveniently-upright position. The particular function of the curved cutting blade ends is to adapt the tool to cut the bunch of beet tops or cabbage stalk, whichever may be operated upon, at practically the same time, on the farther side as on the side nearest the operator and without necessitating his deviating from a path lying between the rows of cabbage or beets. The curved blade ends also permit the operator, when trimming cabbage, to easily reach all sides of the cabbage head without stooping, it being of course understood that the head of cabbage can be entirely and effectively trimmed before the severance of said head from its stalk.

From the above it will be seen that I have provided a vegetable cutter and trimmer which, while highly efficient in accomplishing the purposes intended, is readily operated by one in an upright position, thus eliminating much loss of time and fatigue on the part of the operator employing usual methods and tools, such as an ordinary knife, and which also avoids the danger incident to the use of the latter implement, in the employment of which for this purpose the hand holding the vegetable to be cut or trimmed is necessarily in close proximity to the cutting edge of the tool.

Having thus described my invention, what I claim as new and desire to secure by Letters Patent, is:—

A vegetable trimmer comprising pivotally connected blades, one of said blades being formed with a concaved cutting edge, the concavity of said edge adjacent the free end of the blade being on a curvature of less radius than the curvature of the remainder of said edge, the cutting edge of the remaining blade being straight for the greater portion of its length and curved at the free end on a curvature approximately corresponding to the curvature at the free end of the other blade.

In testimony whereof we have affixed our signatures, in presence of two witnesses.

HENRY RUFTY.
MELVIN RUFTY.

Witnesses:
BYRON W. GROVER,
BYRON A. FOUCHE.